US011631152B2

(12) United States Patent
Chen et al.

(10) Patent No.: US 11,631,152 B2
(45) Date of Patent: Apr. 18, 2023

(54) SECURITY CHECK SYSTEM AND METHOD FOR CONFIGURING SECURITY CHECK DEVICE

(71) Applicant: Nuctech Company Limited, Beijing (CN)

(72) Inventors: Zhiqiang Chen, Beijing (CN); Ziran Zhao, Beijing (CN); Wanlong Wu, Beijing (CN); Yingkang Jin, Beijing (CN); Xianli Ding, Beijing (CN); Jiao Long, Beijing (CN); Zongjun Shen, Beijing (CN); Zheng Li, Beijing (CN)

(73) Assignee: Nuctech Company Limited, Beijing (CN)

( * ) Notice: Subject to any disclaimer, the term of this patent is extended or adjusted under 35 U.S.C. 154(b) by 290 days.

(21) Appl. No.: 16/321,251

(22) PCT Filed: Jul. 31, 2017

(86) PCT No.: PCT/CN2017/095118
§ 371 (c)(1),
(2) Date: Jan. 28, 2019

(87) PCT Pub. No.: WO2018/072520
PCT Pub. Date: Apr. 26, 2018

(65) Prior Publication Data
US 2019/0180398 A1    Jun. 13, 2019

(30) Foreign Application Priority Data

Oct. 17, 2016    (CN) .......................... 201610901778.9

(51) Int. Cl.
*G06Q 10/10*    (2012.01)
*G06Q 40/08*    (2012.01)
(Continued)

(52) U.S. Cl.
CPC ............ *G06Q 50/265* (2013.01); *G06F 16/00* (2019.01); *G06F 16/285* (2019.01); *G06K 9/00* (2013.01);
(Continued)

(58) Field of Classification Search
CPC ...... G06Q 50/265; G06Q 50/26; G06Q 10/10; G07C 9/00; G06K 9/00; G06K 9/62;
(Continued)

(56) References Cited

U.S. PATENT DOCUMENTS 6,088,423 A * 7/2000 Krug .................... G01V 5/0041
378/4
7,834,802 B2 * 11/2010 Keller ................... G01S 13/887
342/22

(Continued)

FOREIGN PATENT DOCUMENTS

| CN | 101196505 A | 6/2008 |
| CN | 201138488 Y | 10/2008 |

(Continued)

OTHER PUBLICATIONS

R. Gesick, C. Saritac, and C.C. Hung, "Automatic image analysis process for the detection of concealed weapons," in Proceedings of the Annual Workshop on Cyber Security and Information Intelligence Research: Cyber Security and Information Intelligence Challenges and Strategies, 2009, pp. 20.1-20.4. (Year: 2009).*

(Continued)

*Primary Examiner* — Jonathan P Ouellette
(74) *Attorney, Agent, or Firm* — Schwegman Lundberg & Woessner, P.A.

(57) ABSTRACT

A security inspection system and a method of configuring a security inspection device are provided. In an embodiment, the security inspection system may include: an identity information entry device configured to enter an identifica-
(Continued)

tion of an inspected person; a parameter determination device configured to determine a parameter for performing a security inspection on the inspected person based on a security factor of the inspected person determined according to user data corresponding to the identification of the inspected person; and a security inspection device configured to perform the security inspection on the inspected person based on the determined parameter. According to embodiments, it is possible to accurately predict the user's behavior and evaluate the risk or potential danger from the user by analyzing and mining the user's comprehensive data, and thus to provide a more accurate security inspection solution.

8 Claims, 4 Drawing Sheets

(51) Int. Cl.
| | |
|---|---|
| G06Q 10/06 | (2012.01) |
| G06Q 30/02 | (2012.01) |
| G06Q 30/06 | (2012.01) |
| G06Q 50/26 | (2012.01) |
| G07C 9/00 | (2020.01) |
| G06K 9/00 | (2022.01) |
| G06K 9/62 | (2022.01) |
| G06F 16/00 | (2019.01) |
| G06V 40/20 | (2022.01) |
| G06V 40/16 | (2022.01) |
| G06F 16/28 | (2019.01) |

(52) U.S. Cl.
CPC .............. *G06K 9/62* (2013.01); *G06Q 50/26* (2013.01); *G06V 40/169* (2022.01); *G06V 40/172* (2022.01); *G06V 40/20* (2022.01); *G07C 9/00* (2013.01); *G06V 2201/05* (2022.01)

(58) Field of Classification Search
CPC ........... G06K 9/00275; G06K 9/00288; G06K 9/00335; G06K 2209/09; G06K 9/00221; G06K 9/00711; G06K 9/00744; G06K 9/6256; G06K 9/6269; G06K 9/6286; G06K 2009/00738; G06F 16/00; G06F 16/285; G06F 16/583
USPC .......................................... 705/1.1–912, 325
See application file for complete search history.

(56) References Cited

U.S. PATENT DOCUMENTS

| | | | | | |
|---|---|---|---|---|---|
| 8,917,913 | B2* | 12/2014 | Kritt | ................... | G06K 9/00677 382/118 |
| 9,230,250 | B1* | 1/2016 | Parker | ................. | G06Q 30/0185 |
| 10,302,807 | B2* | 5/2019 | Yu | ........................ | G06Q 10/083 |
| 10,665,072 | B1* | 5/2020 | Fu | ....................... | G06K 9/00355 |
| 2003/0019933 | A1* | 1/2003 | Tsikos | .................... | G02B 27/48 235/454 |
| 2003/0169906 | A1* | 9/2003 | Gokturk | ............. | G06K 9/00362 382/115 |
| 2005/0024199 | A1* | 2/2005 | Huey | ...................... | B64F 1/368 340/521 |
| 2006/0039600 | A1* | 2/2006 | Solem | ................ | G06K 9/00281 382/154 |
| 2006/0262902 | A1* | 11/2006 | Wattenburg | ............ | G01N 23/04 378/57 |
| 2007/0235652 | A1* | 10/2007 | Smith | .................. | G01V 5/0083 250/363.02 |
| 2008/0212742 | A1* | 9/2008 | Hughes | ................ | G01V 5/0025 378/98.12 |
| 2009/0041293 | A1* | 2/2009 | Andrew | ................. | H04N 5/272 382/100 |
| 2010/0046704 | A1* | 2/2010 | Song | ...................... | G01N 23/04 378/57 |
| 2011/0007870 | A1* | 1/2011 | Roux | ..................... | G01F 23/288 378/57 |
| 2012/0275646 | A1* | 11/2012 | Drouin | ................. | G01N 23/046 382/103 |
| 2013/0266925 | A1* | 10/2013 | Nunamaker, Jr. | ...... | G06N 20/00 434/362 |
| 2014/0052555 | A1* | 2/2014 | MacIntosh | ......... | G06K 9/00664 705/23 |
| 2016/0019668 | A1 | 1/2016 | Kilinski | | |
| 2016/0117898 | A1* | 4/2016 | Kuznetsov | ............. | G08B 21/02 340/600 |
| 2017/0103513 | A1* | 4/2017 | Heilmann | ............ | G06K 9/4609 |
| 2017/0236232 | A1* | 8/2017 | Morton | ................ | G08B 21/182 705/325 |
| 2017/0365118 | A1* | 12/2017 | Nurbegovic | ......... | G01V 5/0008 |

FOREIGN PATENT DOCUMENTS

| | | | |
|---|---|---|---|
| CN | 103310511 | A | 9/2013 |
| CN | 203350918 | U | 12/2013 |
| CN | 104464058 | A | 3/2015 |
| CN | 104933075 | A | 9/2015 |
| CN | 104965235 | A | 10/2015 |
| CN | 105738965 | A | 7/2016 |
| CN | 205562838 | U | 9/2016 |
| JP | 2001306659 | | 11/2001 |
| JP | 2013520722 | A | 6/2013 |
| WO | WO-2012119216 | A1 | 9/2012 |
| WO | WO-2016092072 | A1 | 6/2016 |
| WO | WO-2018023190 | A1 * | 2/2018 ........... G01V 5/0016 |

OTHER PUBLICATIONS

D. Turcsany, A. Mouton, and T. Breckon, "Improving Feature-Based Object Recognition for X-Ray Baggage Security Screening Using Primed Visualwords," School of Engineering, Cranfield University, Bedfordshire, UK. (Year: 2013).*
"International Application Serial No. PCT/CN2017/095118, International Search Report dated Nov. 1, 2017", (Nov. 1, 2017), 2 pgs.
"International Application Serial No. PCT/CN2017/095118, Written Opinion dated Nov. 1, 2017", (Nov. 1, 2017), 3 pgs.
"Japanese Application Serial No. 2019-507210, Office Action dated Mar. 17, 2020", w/ English Translation, (Mar. 17, 2020), 10 pgs.
"European Application Serial No. 17861967.2, Extended European Search Report dated Nov. 7, 2019", (Nov. 7, 2019), 10 pgs.
"Chinese Application Serial No. 201610901778.9, Office Action dated Apr. 6, 2021", w/Concise Statement of Relevance, (Apr. 6, 2021), 10 pgs.
"European Application Serial No. 17 861 967.2, Office Action dated Jan. 22, 2021", (Jan. 22, 2021), 12 pgs.
"Japanese Application Serial No. 2019-507210, Office Action dated Nov. 24, 2020", w/English Translation, (Nov. 24, 2020), 4 pgs.
"Japanese Application Serial No. 2019-507210, Office Action dated Jun. 14, 2022", w English Translation, (Jun. 14, 2022), 24 pgs.

* cited by examiner

SECURITY CHECK SYSTEM AND METHOD FOR CONFIGURING SECURITY CHECK DEVICE

CROSS-REFERENCE TO RELATED APPLICATION(S)

This application is a U.S. National Stage Filing under 35 U.S.C. 371 from International Application No. PCT/CN2017/095118, filed on Jul. 31, 2017, and published as WO2018/072520 on Apr. 26, 2018, which claims priority to a Chinese Patent Application No. 201610901778.9, filed on Oct. 17, 2016 and entitled "Security inspection system and method of configuring security inspection device", the benefit of priority of each of which is hereby claimed herein, and which applications and publication are hereby incorporated herein by reference in their entirety.

TECHNICAL FIELD

The present disclosure relates to the field of security inspection, and in particular, to a security inspection system and a method of configuring security inspection device, enabling a customized security inspection policy based on big data.

BACKGROUND

In recent years, terrorist attacks have gradually escalated and expanded on a global scale, seriously threatening personal safety and even national security. The traditional human body security inspection uses metal detection or manual search, which is not only time-consuming but also infringes on personal privacy. With the development of the society and the science and technology, people's requirements for security inspection are increasing. The traditional low-efficiency manual security inspection methods can no longer meet the needs of people in the new era for security inspection. Human body security inspection devices scan the human body in a contactless manner and can detect objects hidden in clothes. Not only metal substances, but also non-metallic substances carried by the people, such as ceramics, plastics, powders, liquids, colloids, or the like, can be detected. This kind of detection is contactless inspection, and the detection result does not show any physical details of the body, enabling adequate protection of the personal privacy of the inspected person. In addition, this kind of detection is more efficient, and can work continuously without interruption, resulting in efficiency much higher than the traditional manual security inspection. This kind of devices can adopt automatic interpretation method to accurately locate suspicious objects, effectively reducing the influence of artificial factors and reducing the labor intensity of security personnel.

The human body security inspection devices are widely used in the security inspection field because of their unique advantages. However, the existing devices are relatively simple in judging the potential danger of users by only analyzing a scanned image by a hidden object recognition algorithm to determine the possible threat of the inspected person. Also, the hidden object recognition algorithms in the current human body security inspection devices adopt a general algorithm framework, without considering the identity of the users and differences between different users. For all inspected persons, the same type of algorithm frameworks is used for analysis and processing. All of these algorithms are based on the assumption that all users have the same probability of carrying dangerous goods. Therefore, the recognition algorithms are accompanied with false negatives and false positives, which affect the users' experiences.

SUMMARY

In view of the above, the present disclosure aims to provide, among others, a security inspection system and a method of configuring a security inspection device, in which security inspection policies can be customized to different users based on user data.

According to an aspect of the present disclosure, there is provided a security inspection system, comprising: an identity information entry device configured to enter an identification of an inspected person; a parameter determination device configured to determine a parameter for performing a security inspection on the inspected person based on a security factor of the inspected person determined according to user data corresponding to the identification of the inspected person; and a security inspection device configured to perform the security inspection on the inspected person based on the determined parameter.

According to an embodiment of the present disclosure, the security inspection system may further include a security factor determination device configured to acquire user data related to the inspected person based on the identification of the inspected person, and to determine the security factor of the inspected person based on the acquired user data. For example, the security factor determination device may be configured to determine the security factor of the inspected person by substituting the user data of the inspected person into a relationship model between user data and security factors, wherein in the relationship model, the user data are classified into several categories and each category is assigned a different security factor.

According to an embodiment of the present disclosure, the identity information entry device may be further configured to obtain a registered photo of the inspected person.

According to an embodiment of the present disclosure, the security inspection system may further include a video device configured to capture an image of the inspected person in real time.

According to an embodiment of the present disclosure, the security inspection system may further include an authentication device configured to extract a face image of the inspected person from the image captured by the video device, and to verify the identity of the inspected person by comparing the extracted face image with a face image in the registered photo and/or a database of untrusted persons.

According to an embodiment of the present disclosure, the security inspection system may further include an abnormal behavior determination device configured to determine whether the inspected person has an abnormal behavior according to the image of the inspected person captured by the video device.

According to an embodiment of the present disclosure, the user data may comprise one or more of personal data, credit, social relationship, or historical behavior of the inspected person.

According to an embodiment of the present disclosure, the parameter determination device may be configured to determine a parameter applied in a hidden object recognition algorithm employed by the security inspection device based on the security factor of the inspected person.

According to an embodiment of the present disclosure, the security inspection system may further include a display device configured to display a corresponding security level of the inspected person during the security inspection.

According to another aspect of the present disclosure, there is provided a method of configuring the security inspection device in the above security inspection system, comprising: acquiring, by the identity information entry device, an identification of an inspected person; acquiring user data related to the inspected person based on the identification of the inspected person, and determining a security factor of the inspected person according to the acquired user data; determining, by the parameter determination device, a parameter for performing a security inspection on the inspected person based on the security factor of the inspected person; and configuring the security inspection device based on the determined parameter.

According to an embodiment of the present disclosure, the parameter may comprise a parameter applied in a hidden object recognition algorithm employed by the security inspection device. For example, the parameter may comprise one or more of a classifier type, a classifier parameter, or an alarm threshold.

According embodiments of the present disclosure, it is possible to extract high-valued information which can characterize user behavior or the like from massive data with low value density by means of data mining or the like, and to establish an individual security factor model based on the data. Based on the model, in combination with the security parameter setting of the security inspection device, it is possible to customize unique security inspection strategies for different users, resulting in more humanized and personalized security inspection while achieving the goal of accurate security inspection.

BRIEF DESCRIPTION OF THE DRAWINGS

The above and other objects, features and advantages of the present disclosure will become more apparent from the following description of embodiments of the present disclosure with reference to the attached drawings, in which.

DETAILED DESCRIPTION

Figure 1:
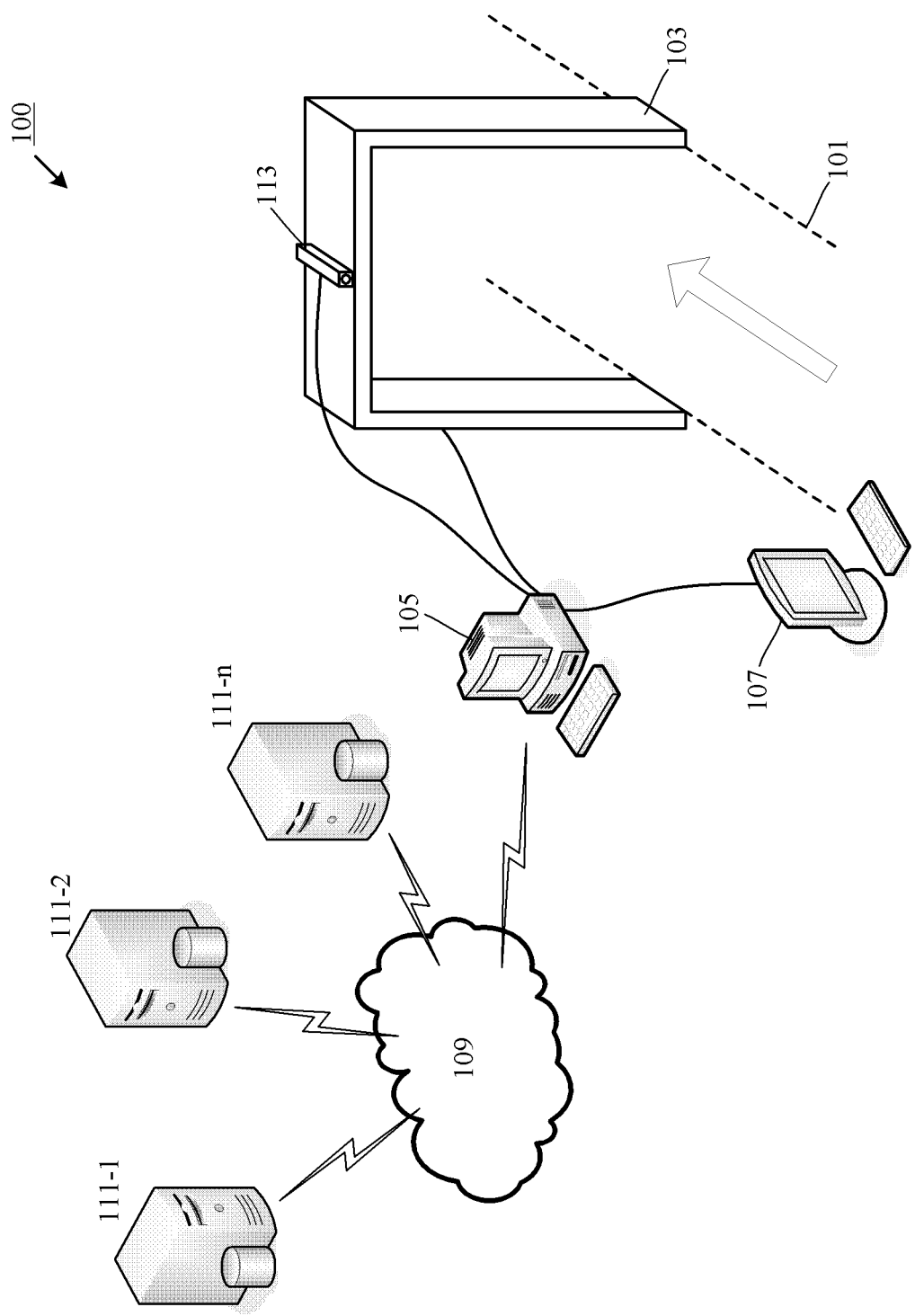
FIG. 1 is a schematic diagram showing a security inspection system according to an embodiment of the present disclosure.

Hereinafter, embodiments of the present disclosure will be described with reference to the accompanying drawings. It should be understood, however, that these descriptions are merely exemplary and are not intended to limit the scope of the present disclosure. In addition, in the following description, descriptions of well-known structures and techniques are omitted to avoid unnecessarily obscuring the concepts of the present disclosure.

The terminology used herein is for the purpose of describing particular embodiments only and is not intended to be limiting of the disclosure. The words "a", "an", "the", or the like, as used herein, shall also include the meaning of "a plurality" and "multiple", unless the context clearly dictates otherwise. Furthermore, the terms "include", "comprise", or the like as used herein indicate the presence of stated features, steps, operations, and/or components, but do not preclude the presence or addition of one or more other features, steps, operations, or components.

All terms (including technical and scientific terms) used herein have the meaning as commonly understood by one of ordinary skill in the art, unless otherwise defined. It should be noted that terms used herein should be interpreted as having a meaning that is consistent with the context of the present description and should not be interpreted in an idealized or overly formal manner.

Several block diagrams and/or flow charts are shown in the drawings. It should be understood that some of the blocks or combinations thereof in the block diagrams and/or flow charts may be implemented by computer program instructions. Such computer program instructions may be provided to a processor of a general purpose computer, a special purpose computer, or other programmable data processing apparatus such that the instructions, when executed by the processor, may create means for implementing the functions/operations illustrated in these block diagrams and/or flow charts.

Accordingly, the techniques of the present disclosure may be implemented in the form of hardware and/or software (including firmware, microcode, or the like). Additionally, the techniques of the present disclosure may take the form of a computer program product on a computer readable medium having stored thereon instructions for use by or in connection with an instruction execution system. In the context of the present disclosure, a computer readable medium may be any medium that can contain, store, communicate, propagate, or transport the instructions. For example, the computer readable medium may include but are not limited to electrical, magnetic, optical, electromagnetic, infrared, or semiconductor systems, apparatus, devices, or propagation medium. Specific examples of the computer readable medium include a magnetic storage device such as a magnetic tape or a hard disk drive (HDD), an optical storage device such as a compact disc (CD-ROM), a memory such as a random access memory (RAM) or a flash memory, and/or a wired/wireless communication link.

FIG. 1 is a schematic diagram showing a security inspection system in accordance with an embodiment of the present disclosure.

As shown in FIG. 1, the security inspection system 100 according to this embodiment includes a security inspection device (103, 105) disposed on a security inspection lane 101.

The security inspection lane 101 may be located at an entrance to any place where secure access is necessary, such as an airport, station, stadium, museum, or the like. The security inspection lane 101 may be a real lane surrounded by a barrier such as a fence, or a virtual lane defined by, for example, a video device. For example, an inspected person may walk within the surveillance range of the video device, which may be considered a "lane."

The inspected person passes through the security inspection lane 101, for example, in a direction indicated by the arrow in the figure, while receiving a security inspection by the security inspection device. The inspected person may be allowed to enter the place to access if he passes the inspection by the security inspection device.

The security inspection device may include a scanning device 103 and a control device 105. For human body security inspection, the scanning device 103 may be contactless. For example, the scanning device 103 may illuminate the inspected person by rays (for example, millimeter waves), and collect rays from the inspected person (for example, by scattering), under the control of the control device 105. The data received by the scanning device 103 may be transmitted to the control device 105 via a wired link (e.g., a cable) or a wireless link (e.g., WiFi), so that a (body surface) image of the inspected person may be reconstructed by a reconstruction algorithm in the control device 105. In addition, the control device 105 may also identify objects that may be hidden in the clothing worn by the inspected person by a hidden object recognition algorithm. The imaging results and the recognition results may be output by an output device such as a display, as will be further described below. The control device 105 may include various computing devices such as computers, servers, or the like.

According to an embodiment of the present disclosure, the hidden object recognition algorithm for the scanned image of the human body may include two parts, i.e., classifier training and online recognition. Both parts are based on partitioned images. The scanned image of the human body may be first partitioned into several areas, such as the arm, the trunk, the leg, or the like, according to positions of some key points of the body. In an example, the classifier training may be performed as follows: 1) creating a database of positive and negative samples for each of the partitioned images; 2) feature extraction: characterizing each of the partitioned images with dense scale-invariant feature transform (SIFT) features; 3) obtaining an over-complete dictionary of dense SIFT features by training with the sparse coding principle; 4) projecting the feature descriptors in 2) into the dictionary to obtain coded vectors; and 5) obtaining a classifier by training with a support vector machine (SVM). Online recognition may be performed as follows: 1) first extracting dense SIFT features of the partitioned image to be recognized; 2) calculating projected vectors of the aforementioned features in the dictionary; and 3) inputting the projected vectors into the trained SVM classifier for classification.

Certainly, in addition to the SVM classifier, other classifiers such as Linear Spatial Pyramid Matching (LSPM) or Locality-constrained Linear coding (LLC) or a combination thereof may be used. There are many other hidden object recognition algorithms in the art, detailed descriptions of which are omitted here.

In this example, the scanning device 103 is illustrated as a gate structure, but the disclosure is not limited thereto. The scanning device 103 may have a different form, such as a rotary scan. There are various types of security inspection devices in the field, and currently commonly used human body security inspection devices are based, for example, on the millimeter wave holographic imaging technology.

In addition, in this example, only the scanning device 103 for the human body is shown. According to an embodiment of the present disclosure, a scanning device (not shown) for articles such as baggage carried by the inspected person, such as an X-ray scanning device (which may share the same control device as the human body scanning device 103, or have a separate control device) may be further included. For example, when the inspected person enters the security inspection lane 101, he or she can put his or her baggage onto a conveyor belt to pass through the X-ray scanning device while he or she passes through the scanning device 103.

As described above, conventionally the security inspection device employs the same security inspection policy, specifically, the same parameters (including parameters employed in the scanning device 103 and parameters employed in the control device 105), for different inspected persons. However, in the actual security inspection process, the possibility of carrying dangerous goods is very different between different persons. If the principle of "everyone is equal" is still followed during the security inspection of the inspected persons, the accuracy of the security inspection results will be affected.

According to an embodiment of the present disclosure, different security inspection policies may be employed for different inspected persons. Specifically, a security inspection model specific to each individual may be established in consideration of differences in identity and behavior of the individual from others. As a result, it is possible to significantly improve the efficiency of security inspection, and to reduce false positive results by the security inspection device for trusted persons while strengthening the security inspection intensity for suspicious persons, so as to timely detect and identify potential illegal actions by these people during the security inspection process to prompt policemen to take corresponding measures.

To this end, the system 100 may include an identity information entry device 107 for entering an identification of the inspected person. The identity information entry device 107 may include various types of information input devices. For example, the identity information entry device 107 may include a keyboard and/or a touch screen. The security personnel may check an identity document of the inspected person such as an identity card or a passport, and manually input through the identity information entry device 107 the identification of the inspected person which may uniquely identify the identity of the inspected person, such as the number on the inspected person's identity document, such as the identity card number, passport number, or the like (generally the name will not be used, because there is a greater possibility of having a duplicate name). Alternatively, the identity information entry device 107 may include an optical or electronic reading device. For example, the identity information entry device 107 may read a one-dimensional code (e.g., a barcode) or a two-dimensional code present on the identity document, or may read information from the identity document wirelessly based on, for example, the radio frequency identification (RFID) or near field communication (NFC) technology.

Certainly, it is not necessary to use the identity document, but other documents associated with the user's identity may be used. For example, in the case of an airport, a boarding pass may be used. The user's identity and the corresponding identification such as the identity card number or passport number may be known by scanning the barcode on the boarding pass and querying an airline's database. For another example, in the case of a station, if a real-name ticket system is adopted, the user's identity and the corresponding identification may be known by scanning a two-dimensional code on the ticket and querying a ticketing database of the station.

Certainly, the identity information entry device 107 is not limited to entering the identification of the inspected person, but may also input other identity information. For example, as described in the following embodiments, the identity information entry device 107 may also acquire a registered photo of the inspected person. Here, the "registered photo" refers to a photo used by the inspected person to clearly reflect his or her appearance when registering his or her identity with a trusted institution. For example, such a registered photo may be a photo used by the inspected person to apply for the identity card or passport in a police office.

The identity information entry device 107 may obtain the above registered photo directly from the identity document with photo printed thereon (for example, by image recognition), or may obtain the above registered photo from a relevant trusted database (for example, the police office's database) based on the entered identification.

The identity information entry device 107 may be placed at the entrance of the security inspection lane 101. When the inspected person enters the security inspection lane 101, his or her identification may be entered by the identity information entry device 107 and transmitted to the control device 105 via a wired or wireless link. The control device 105 may obtain user data related to the inspected person identified by the identification from databases 111-1, 111-2, . . . , 111-n via a network 109. Here, the user data may include various data capable of characterizing the user, such as data related to the identity and behavior of the inspected person, including but not limited to one or more of personal data, credit, social relationship, or historical behavior of the inspected person. Here, the user data may reflect sociological characteristics of the user, rather than biological features (e.g., height, weight, blood type, fingerprint, iris, etc.).

Figure 2:
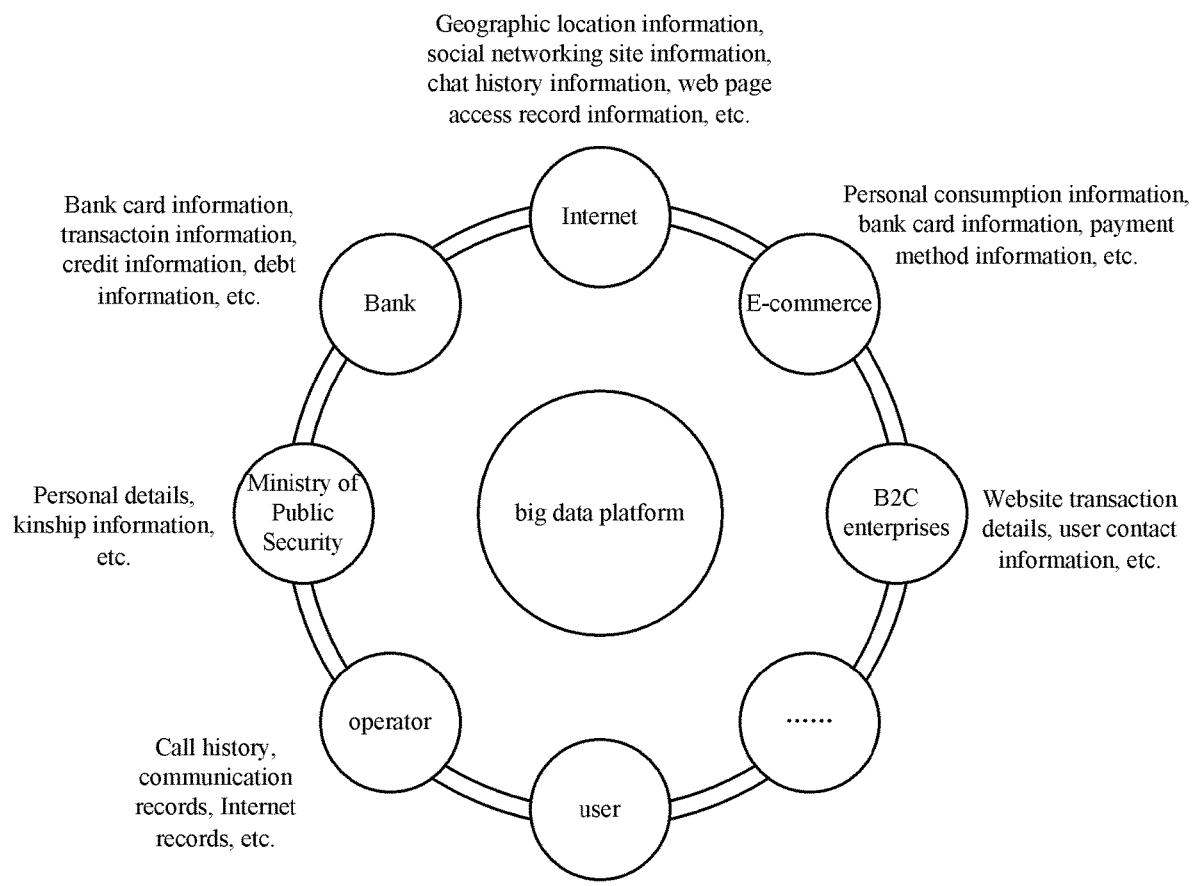
FIG. 2 is a schematic diagram showing various user data.

With the rapid development of the Internet, the Internet of Things and the mobile Internet, various types of data have shown significant growth in recent years, and studies have shown that the amount of data will increase exponentially in the next few years. In the era of big data, user data are widely distributed in various fields. FIG. 2 is a schematic diagram showing various user data. For example, basic personal information of the user, including information such as name, gender, age, former name, place of birth, contact information, employer, residence address, marriage history, and kinship, may be obtained through the personal information inquiry system of the Ministry of Public Security. Further, call history, communication records, and Internet records of the user may be obtained through telecommunication operators. By analyzing the data, it is possible to obtain contact information, duration of each call, frequency of making calls, time and location of each visit to the network, and IP addresses of visited web sites, or the like for the user. Furthermore, bank card information, transaction information on clothing, food, housing, transportation or the like, credit status, and debt information of the user may be obtained through banking systems. Furthermore, personal consumption details, categories of browsed products, payment habits, online transaction details, and user contact information of the user may be obtained through e-commerce and B2C enterprises. Furthermore, all traces left by the user on the Internet, such as websites that the user frequently visits and their themes and contents, log information of visits, website browsing records, and chat information, shared information and comment information in social networking sites such as WeChat and Weibo, or the like may be tracked through the Internet.

The user data is of significant value, and there is some connection, more or less, between pieces of data. Through the analysis of the above data, comprehensive information of the user, such as the user's hobbies, personality characteristics, thought fluctuations, emotional changes, family relationships, personal connections, work experience, economic status, credit status, debt situation, living habits, behavior habits, consumption habits and travel tracks, may be inferred. The potential hazard from the user may be predicted from the data such as the user's family relationship, employment status, interpersonal relationship, whether or not there has been a significant change in his or her family or around, or the like. The user's recent consumption records may be obtained from the user's consumption data, and by analyzing the consumption records, it is possible to obtain information such as whether the user has purchased contraband goods, dangerous goods, and materials that may be used to make dangerous goods. In addition, by analyzing the consistency of the user's recent consumption records and his or her past consumption habits, it is possible to predict the possibility that the user will take abnormal behaviors that might be harmful to the society. Further, it is possible to know the possibility that the user is to make anti-social words and actions through information on web pages frequently browsed by the user, messages forwarded by the user, and speeches made by the user. Furthermore, it is possible to indirectly predict the security level of the user according to security levels of the user's common contacts by drawing a personal relationship map for the user which is centered at the user from the user's activity data in the social networks, and comprehensively analyzing data such as social activities of other users who interact with the user frequently.

According to an embodiment of the present disclosure, the system 100 may include a security factor determination device for acquiring the user data related to the inspected person based on the identification of the inspected person, and determining the security factor of the inspected person based on the acquired user data. In this example, the security factor determination device may be implemented, for example, by running program instructions by the control device 105. However, the present disclosure is not limited thereto. Alternatively, the security factor determination device may be implemented by a separate entity, such as a computing device. For example, the control device 105 may extract data related to the identity and behavior of different persons from a large amount of data by, for example, the data mining technology, and classify those persons based thereon, and apply different levels of security inspection policies to different categories of persons.

For example, a scoring mechanism may be established to characterize the security level of the inspected person based on his or her security factor. The higher is the security factor, the more normal is the inspected person. The corresponding security factor of the inspected person may be used as a guide for setting the parameters used in the security inspection device to perform the security inspection on the inspected person (for example, the parameters applied in the hidden object recognition algorithm), thereby realizing differentiated and personalized security inspection for different inspected persons. In reality, some inspected persons' data may be missing or only partially available. Such inspected persons may be assigned lower security factors so that they will be subject to strengthened inspection, in order to prevent adverse effects due to false negatives during the security inspection process. In the following, the determination of the security factor will be described in further detail.

In addition, the user data may further include historical security inspection data, including historical departure and destination locations, and results of previous security inspections (including security inspections of the inspected person and his or her accompanying person(s) themselves and also their baggage, or the like). In establishing the user security factor model, pieces of data including some special locations and bad historical records may have increased weights assigned thereto, that is, these pieces of data may have increased impacts on the safety factor.

According to an embodiment of the present disclosure, the system 100 may include a parameter determination device for determining a parameter for performing the security inspection on the inspected person based on the determined security factor of the inspected person. In this example, the parameter determination device may be implemented, for example, by the control device 105 running program instructions. However, the present disclosure is not limited thereto. The parameter determination device may also be implemented by a separate entity, such as a computing device. The basic principle of the parameter determination is as follows: for inspected persons with relatively high security factor values, relatively loose parameters may be set to appropriately reduce the intensity of the security inspection on those persons, and thus to improve the experience of the security inspection device by those relatively safe persons and speed up the passage of those persons;

while for persons with relatively low security factor values, relatively strict parameters may be set to enhance the intensity of the security inspection on those persons.

These parameters may be any parameters in the system related to the security inspection intensity, such as parameters related to hardware (e.g., scanning parameters in the scanning device 103) and/or parameters related to software (e.g., various algorithms employed in the system). Certainly, it is less convenient to constantly change the hardware parameters for different inspected persons, so it is preferable to change the software parameters. For example, the parameters may be parameters applied in the hidden object recognition algorithm employed by the security inspection device, including one or more of a classifier type, a classifier parameter, or an alarm threshold. For example, a SVM classifier may be used. In this case, the classifier type may be controlled by adjusting a kernel function. The classifier parameter may include a penalty factor or the like. The alarm threshold is a distance between a classification plane corresponding to the classifier and an optimal segmentation hyperplane. The closer the classification plane is to the category of suspected goods, the smaller is the alarm threshold. For the inspected persons with higher security factors, it is possible to use a linear classifier with higher generalization ability or a SVM classifier corresponding to a smaller penalty factor, and to increase the alarm threshold; while for the inspected persons with lower security factors, it is possible to use a nonlinear classifier or a SVM classifier corresponding to a penalty factor, which may be increased to increase the positive detection rate, and to reduce the alarm threshold, so as to avoid losses due to the false negatives.

According to an embodiment of the present disclosure, the system 100 may further include a video device 113 such as a camera for capturing an image of the inspected person in real time. In this example, the video device 113 is illustrated as being disposed on the scanning device 103, but the disclosure is not limited thereto. The video device 113 may be placed at any other location in the security inspection lane. The number of the video device 113 is not limited to one, but may be more. The video device 113 may be arranged such that its or their capturing or monitoring range may cover the security inspection lane 101 so that the inspected person can be monitored in real time without dead space when the inspected person is passing through the security inspection lane 101. As mentioned above, the security inspection lane may also be defined by the monitoring range of the video device 113.

In the case where the video device 113 is provided, the system 100 may further include an abnormal behavior determination device for determining whether the inspected person has an abnormal behavior based on the image of the inspected person taken by the video device 113. In this example, the abnormal behavior determination device may be implemented, for example, by the control device 105 running program instructions. In this case, the video device 113 may be connected to the control device 105 by wire or wirelessly. However, the present disclosure is not limited thereto. The abnormal behavior determination device may also be implemented by a separate entity such as a computing device. The control device 105 may use the computer vision technology to extract a contour image of the inspected person from the video collected by the video device 113 and perform dynamic tracking, and use a person modeling model pre-trained by the machine learning method to monitor the abnormal behavior. Once the inspected person is found to have abnormal behavior, the policemen may be notified in a timely manner.

In addition, the system 100 may further include an authentication device for extracting a face image of the inspected person from the image taken by the video device 113, and verifying the identity of the inspected person by comparing the extracted face image with the registered photo of the inspected person. In this example, the authentication device may be implemented, for example, by the control device 105 running program instructions. However, the present disclosure is not limited thereto. The authentication device may also be implemented by a separate entity, such as a computing device. Here, the registered photo of the inspected person is, for example, a registered photo input by the identity information entry device 107, or a registered photo obtained from the relevant trusted databases as described above. If there is some inconsistency between the person and the identity document, the system may issue an alarm to the security personnel to carry out manual verification on the inspected person, and also open the baggage carried by the inspected person for more careful inspection.

On the other hand, the authentication device may also compare the extracted face image with face images from a database of untrusted persons. For example, the database of untrusted persons may include a face image database of fugitive suspects provided by the Ministry of Public Security, a face image database of persons restricted from entering or leaving the country or restricted from leaving a certain place published by the court, or the like. If there is a high degree of matching, relevant personnel may be notified to conduct a security review.

The control device 105 may configure the security inspection device using the parameters determined by the parameter determination device by, for example, configuring parameters applied in the hidden object recognition algorithm employed by the security inspection device (more specifically, configuring the type of the classifier, parameters of the classifier, and/or the alarm threshold therein). By processing the image of the inspected person obtained by the scanning device 103 with the algorithm thus configured, it is possible to identify whether or not the inspected person has concealed some article. The inspection results may be output to the security personnel.

According to an embodiment of the present disclosure, complementary displays at a remote end and the device end may be employed. Specifically, at the security inspection device (e.g., at the control device 105), only a doll picture reflecting the contour of the human body and corresponding alarm information and identity information of the inspected person may be displayed. On the other hand, a remote console may be provided in a closed monitoring room at a certain distance from the security inspection device. The actual scanned image is displayed only on the remote console, with the face blurred. The security inspector at the remote console may view and process the scanned image of the current inspected person, but does not know any personal information related to the identity of the current inspected person. At the remote console, the scanned image of the inspected person may be deleted immediately upon completing a scan and corresponding inspection. Further, the doll picture displayed on the security inspection device does not have any surface information of the scanned person, thereby enabling adequate protection of the personal privacy of the inspected person.

That is to say, on the remote end and the device end, the security inspection results may be displayed in a manner that complements each other, without an intersection therebetween. In this way, it is possible to, on one hand, protect the personal privacy of the inspected person, and on the other hand, clearly review the inspection result of the inspected person.

In the above embodiments, the centralized control device 105 is shown, but the present disclosure is not limited thereto. Distributed control devices are also possible. For example, one or more components of the system 100 may have a corresponding control device, while other components may have other control device(s).

In the above examples, the security factor determination device is incorporated in the security inspection system 100. However, the present disclosure is not limited thereto. For example, multiple security inspection systems may share the same security factor determination device. For example, at an airport, security inspection systems deployed at different security inspection lanes may share a server that acts as a security factor determination device. Alternatively, the security factor determination device may be provided by a professional data analysis company. The security inspection system 100 may send the entered identification of the inspected person to a server of the data analysis company, and the server of the data analysis company retrieves relevant user information and performs data analysis to obtain the security factor of the inspected person. Subsequently, the security factor may be sent to the security inspection system 100, and then the parameter determination device may determine the security inspection parameters for the inspected person based on the received security factor.

Figure 3:
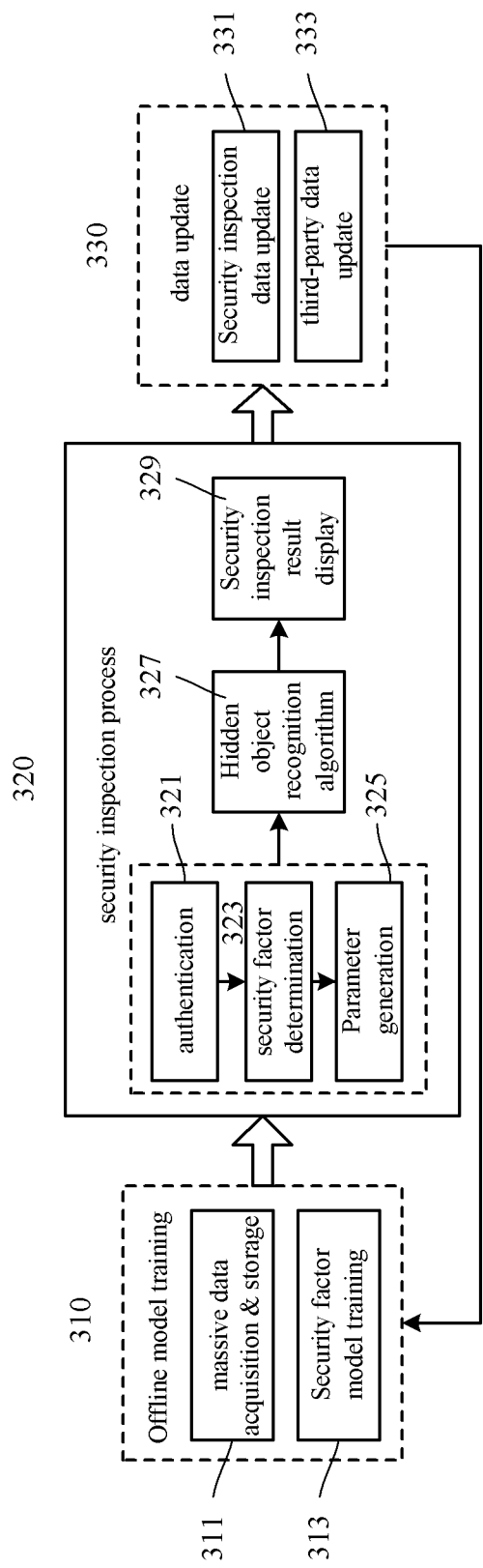
FIG. 3 is a schematic diagram showing a flow of a security inspection system according to an embodiment of the present disclosure.

Hereinafter, an operational flow of the above-described security inspection system will be described with reference to FIG. 3.

First, as shown at 310, model training may be performed to establish a relationship model between user data and security factors. This may be done in the security inspection system 100 (e.g., the control device 105) described above, or may be performed outside of the security inspection system 100 by, for example, the professional data analysis company described above.

Specifically, as shown at 311, a plurality of databases (for example, 111-1, 111-2, . . . , 111-n as shown in FIG. 1) may be used to respectively receive a large amount of shared data from third-party organizations that have established partnerships, including name data, age data, place of birth data, residence data, document number data, interpersonal relationship data, communication data, transaction data, credit data, social activity data, social network data, and other user-related data. These massive data are cleaned and pre-processed and imported into a large distributed database. The user data may be stored hierarchically according to key information such as age, region and occupation, for convenience of reading the data later. For example, data such as texts, images, audio, video, or the like related to users may be obtained from departments with rich and reliable source data such as the Ministry of Public Security, operators, banks, e-commerce, B2C companies, and Internet companies, and these massive data may be formatted and imported into a large distributed database for storage.

Then, as shown at 313, the massive data embodying user information may be analyzed and processed by methods such as data mining, machine learning and statistical analysis to establish the relationship model between user data and security factors. According to an embodiment of the present disclosure, the user data may be clustered into several categories, and each category is assigned a different security factor value. For example, such a model may be built as follows.

Figure 4:
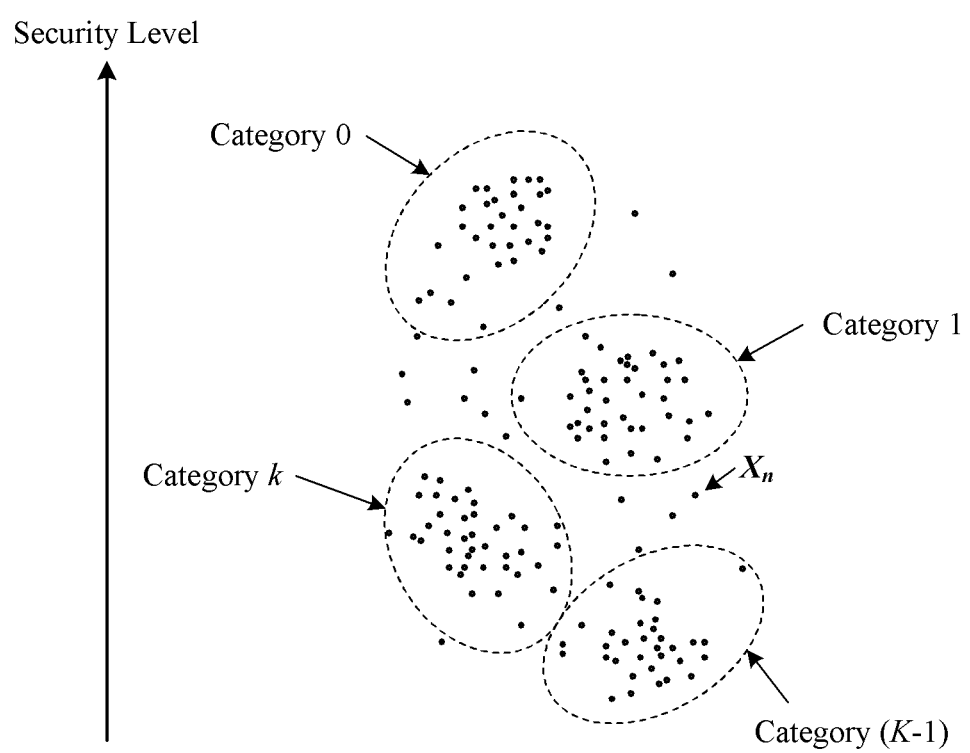
FIG. 4 is a schematic diagram showing an example clustering of user data.

Suppose that the large amount of user data extracted from the database are $S=\{X_n, n=1, \ldots, N\}$, where $X_n=\{x_j^{(n)}, j=1, \ldots, |X_n|\}$, N represents the total number of pieces of the user data, $X_n$ represents the data of the n-th user, $|X_n|$ represents the dimension of the data of the n-th user, and $x_j^{(n)}$ represents data information of the j-th dimension of the n-th user, which may be structured data such as numbers, or may be unstructured data such as text, image, audio, video, or web page. Referring to FIG. 4, these user data may be represented as points in a data space.

The user data may be clustered into several categories. For example, the K-means clustering algorithm may be used to classify the input user data into K categories according to their respective characteristics, with centers of the respective categories represented by $C=\{C_i, i=0, \ldots, K-1\}$. The classification result is schematically shown by dotted circles in FIG. 4. According to an embodiment of the present disclosure, each of the categories is assigned a different security factor value according to the security level presented by the users corresponding to that category. As shown in FIG. 4, the 0th category has the highest security level, the 1th category has the second highest security level, . . . , and the (K−1)-th category has the lowest security level. Here, the category center $C_i$ is used to indicate the i-th security level. That is, users of the same category have the same security level ($C_i$). For $C_i$, the larger i is, the lower the security level of the users of the corresponding category.

Then, the relationship model between user data and security factors is established. For example, the relationship between user data x and its security factor may be expressed by D=f(x), where $$f(x) = 1 + \beta k \left(1 + \beta e^{\frac{\|x-C_k\|}{\|C_k\|}}\right),$$

where k=0, . . . , K−1, wherein $$\beta = -\frac{1}{K-1},$$

x belongs to the k-th category (which is determined according to an Euclidean distance between x and the center of each category $C_i$, for example, x belongs to the category represented by the category center $C_i$ closest to it), and $\|\cdot\|$ represents Euclidean distance.

Different users may have different security factors due to the difference between their respective data, and the security factor may range from (0, 1]. The greater the security factor value, the higher the security level of the user. It can be known from the relationship expression between the user data and the security factor D=f(x) that for the data belonging to the same category, the farther the user data is from the center of the category, the larger the corresponding security factor D is. However, this is just an example. Other models may be created in which, for example, for the same category of data, substantially the same security factor may be assigned.

The established model may be stored at the security factor determination device (which may be within or outside the security inspection system 100 as described above), or may be stored outside of the security factor determination device (in this case, the security factor determination device may request the model from the device in which the model is stored).

In the actual security inspection process 320, the identification of the user is first entered by the identity information entry device 107 (optionally, other identity information such as the above registered photo is also entered). In the case of entering the registered photo, authentication may be performed at 321. For example, as described above, authentication may be performed by comparing the registered photo with the face image from the image captured by the video device 113.

The security factor determination module (e.g., control device 105) may obtain user data based on the entered user identification and determine the security factor for the user using the model established as described above, as indicated at 323. Certainly, the control device 105 may also send the entered user identification to a security factor determination module external to the system and receive the determined security factor from the external security factor determination module. After the user's security factor is determined, the security inspection device may be configured accordingly. For example, as indicated at 325, parameters of the security inspection device, such as parameters applied in the hidden object recognition algorithm, including the classifier type, the classifier parameter, the alarm threshold, or the like, may be generated based on the security factor by, for example, a self-learning algorithm. These parameters may be represented in the form of a parameter vector.

Specifically, the relationship between the current user data x and the K category centers may be calculated to determine the category center $C_k$ of the user, and then the user data x may be substituted into the above model D=f(x), thereby calculating the security factor of the current inspected person. The security level $C_k$ corresponding to the user may also be output to the device end and the remote end to notify the security personnel of the security level of the user, so as to prompt the security personnel to be ready to take appropriate measures. As a result, it is possible to improve the throughput of the device and reduce the occurrence of dangerous events.

Through the analysis of the user's security factor, the inspection measures and inspection strength may be adjusted accordingly. As mentioned above, for users with a large security factor value (for example, D>0.8), the intensity of the security inspection on those persons may be appropriately reduced to improve the experience of the security inspection device by such relatively safe persons and speed up the passage of those persons; while for users with a small security factor value (for example, D<0.4), the intensity of the security inspection of such users may be enhanced, and the relevant information such as the security level of such users may be provided by the system to the security staff for early warning, prompting the staff to take corresponding protective measures.

The security inspection device may receive the security inspection parameters, for example, sent in the form of a parameter vector, configure itself with the received parameters, and perform security inspection on the user. For example, millimeter waves may be emitted to illuminate the user to image the user based on millimeter waves from the user, and the image may be processed using a hidden object recognition algorithm, as shown at 327. The results of the inspection may be displayed as shown at 329. As mentioned above, the display may be done in a complementary manner at the remote end and the device end.

According to an embodiment of the present disclosure, the data may also be updated as indicated at 330.

At the end of each security inspection, the data of the current inspected person may be updated. For example, the information involved in the security inspection process may be collected in real time and stored in the corresponding database, as shown at 331. The data update consists of two parts, namely, the information of the present security inspection process and the personal information of the inspected person. For example, the security inspection process information includes the number and location of the current security inspection device, information of the on-duty security inspector, or the like. The personal information of the inspected person includes the document information, the travel location, the face image, the video data recorded in the security inspection lane, the imaging data, the results of the present security inspection, or the like.

In addition, in the era of big data, user data are being constantly updated, and the users' security factors are constantly changing as the data changes. Therefore, as shown at 333, the large-scale data provided by the third-party platform may be grasped and updated in real time to ensure the real-time and reliability of the security inspection.

According to embodiments of the present disclosure, it is possible to accurately predict the user's behavior and evaluate the risk or potential danger from the user by analyzing and mining the user's comprehensive data, and thus to provide a more accurate security inspection solution.

The embodiments of the present disclosure have been described above. However, these embodiments are for illustrative purposes only and are not intended to limit the scope of the present disclosure. Although the respective embodiments are separately described above, this does not mean that the measures in the respective embodiments cannot be used in combination to advantage. The scope of the disclosure is defined by the appended claims and their equivalents. Numerous alternatives and modifications may be made by those skilled in the art without departing from the scope of the present disclosure, and such alternatives and modifications should all fall within the scope of the present disclosure.

What is claimed is:

1. A security inspection system, comprising:
    an identity information entry device configured to enter an identification of an inspected person;
    a security factor determination device configured to grasp, from a third-party platform, user data related to the inspected person in real time based on the identification of the inspected person, and determine the security factor of the inspected person by substituting the user data of the inspected person into a relationship model between user data and security factors;
    a parameter determination device configured to determine a parameter for performing a security inspection on the inspected person based on a security factor of the inspected person determined according to user data corresponding to the identification of the inspected person, the parameter comprising one or more of a classifier type, a classifier parameter and an alarm threshold in a trained hidden object recognition algorithm determined based on the security factor; and a security inspection device configured to perform the security inspection on the inspected person, wherein performing the security inspection on the inspected person comprises processing a scanning image of the inspected person based on the determined parameter for performing the security inspection on the inspected person, so as to identify whether or not the inspected person has concealed some article, wherein the security inspection device is further configured to perform the security inspection on the inspected person by using the trained hidden object recognition algorithm based on the determined parameter, comprising: extracting features of the inspected person; calculating projected vectors of the features in a dictionary; and inputting the projected vectors into a classifier corresponding to the determined parameter for classification, wherein the user data of the current inspected person is updated at an end of each security inspection, updating the user data of the inspected person comprises updating the user data of the third-party platform in real time, and the relationship model is established by using the updated user data for offline model training, wherein in the relationship model, user data from the third-party platform are classified into a plurality of categories assigned with different security factors respectively, and a category to which the inspected person belongs is determined according to a Euclidean distance between the user data of the inspected person and a center of each of the plurality of categories; and wherein the security factor comprises a first security factor and a second security factor less than the first security factor, the parameter comprises a first parameter determined based on the first security factor and a second parameter determined based on the second security factor, the first parameter comprises a linear classifier, a first penalty factor of the classifier and a first alarm threshold, the second parameter comprises a nonlinear classifier, a second penalty factor of the classifier and a second alarm threshold, the generalization ability of the linear classifier is higher than the generalization ability of the nonlinear classifier, the second penalty factor is higher than the first penalty factor, and the second alarm threshold is lower than the first alarm threshold.

2. The security inspection system according to claim 1, wherein the identity information entry device is further configured to obtain a registered photo of the inspected person.

3. The security inspection system according to claim 2, further comprising:
an authentication device configured to extract a face image of the inspected person from the image captured by the video device, and to verify the identity of the inspected person by comparing the extracted face image with a face image in the registered photo and/or a database of untrusted persons.

4. The security inspection system according to claim 1, further comprising:
a video device configured to capture an image of the inspected person in real time.

5. The security inspection system according to claim 4, further comprising:
an abnormal behavior determination device configured to determine whether the inspected person has an abnormal behavior according to the image of the inspected person captured by the video device.

6. The security inspection system according to claim 1, wherein the user data comprises one or more of personal data, credit, social relationship, or historical behavior of the inspected person.

7. The security inspection system according to claim 1, further comprising:
a display device configured to display a corresponding security level of the inspected person during the security inspection.

8. A method of configuring a security inspection device in a security inspection system, comprising:
acquiring, by an identity information entry device, an identification of an inspected person;
grasping, from a third-party platform, user data related to the inspected person in real time based on the identification of the inspected person, and determining the security factor of the inspected person by substituting the user data of the inspected person into a relationship model between user data and security factors;
acquiring user data related to the inspected person based on the identification of the inspected person, and determining a security factor of the inspected person according to the acquired user data;
determining, by a parameter determination device, a parameter for performing a security inspection on the inspected person based on the security factor of the inspected person, comprising determining one or more of a classifier type, a classifier parameter and an alarm threshold in a trained hidden object recognition algorithm based on the security factor; and
configuring the security inspection device based on the determined parameter, wherein the security inspection device is configured to perform the security inspection on the inspected person, wherein the security inspection device is further configured to perform the security inspection on the inspected person by using the trained hidden object recognition algorithm based on the determined parameter, comprising: extracting features of the inspected person; calculating projected vectors of the features in a dictionary; and inputting the projected vectors into a classifier corresponding to the determined parameter for classification,
wherein the user data of the current inspected person is updated at an end of each security inspection, updating the user data of the inspected person comprises updating the user data of the third-party platform in real time, and the relationship model is established by using the updated user data for offline model training,
wherein performing the security inspection on the inspected person comprises processing a scanning image of the inspected person based on the determined parameter for performing the security inspection on the inspected person, so as to identify whether or not the inspected person has concealed some article,
wherein in the relationship model, user data from the third-party platform are classified into a plurality of categories assigned with different security factors respectively, and a category to which the inspected person belongs is determined according to a Euclidean distance between the user data of the inspected person and a center of each of the plurality of categories; and
wherein the security factor comprises a first security factor and a second security factor less than the first security factor, the parameter comprises a first parameter determined based on the first security factor and a second parameter determined based on the second security factor, the first parameter comprises a linear classifier, a first penalty factor of the classifier and a first alarm threshold, the second parameter comprises a nonlinear classifier, a second penalty factor of the classifier and a second alarm threshold, the generalization ability of the linear classifier is higher than the generalization ability of the nonlinear classifier, the second penalty factor is higher than the first penalty factor, and the second alarm threshold is lower than the first alarm threshold.

\* \* \* \* \*